US011238575B2

(12) United States Patent
Drescher et al.

(10) Patent No.: US 11,238,575 B2
(45) Date of Patent: Feb. 1, 2022

(54) MICROSCOPIC IMAGING METHOD USING A CORRECTION FACTOR

(71) Applicant: Carl Zeiss Microscopy GmbH, Jena (DE)

(72) Inventors: Viktor Drescher, Blankenhain (DE); Nils Langholz, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 371 days.

(21) Appl. No.: 16/445,802

(22) Filed: Jun. 19, 2019

(65) Prior Publication Data

US 2020/0005442 A1 Jan. 2, 2020

(30) Foreign Application Priority Data

Jun. 28, 2018 (DE) .......................... 102018210606.1

(51) Int. Cl.
*G06T 5/50* (2006.01)
*H04N 5/225* (2006.01)
(Continued)

(52) U.S. Cl.
CPC .............. *G06T 5/50* (2013.01); *G02B 21/008* (2013.01); *G06T 5/001* (2013.01); *G06T 7/0012* (2013.01);
(Continued)

(58) Field of Classification Search
CPC ......... G06T 5/50; G06T 5/001; G06T 7/0012; G06T 2207/10056; G06T 2207/10148;
(Continued)

(56) References Cited

U.S. PATENT DOCUMENTS 5,923,430 A * 7/1999 Worster ........... G01N 21/95607
356/394
5,923,465 A * 7/1999 Byrd .................... G03H 1/2205
359/368

(Continued)

FOREIGN PATENT DOCUMENTS

DE        100 14 331 A1    10/2000
DE   10 2014 004 249 A1     9/2015
WO         97/31282 A1      8/1997

OTHER PUBLICATIONS

Petroli et al., In Vivo Confocal Microscopy of the Cornea: New Developments in Image Acquisition, Reconstruction, and Analysis Using the HRT-Rostock Corneal Module (pp. 187-203). (Year: 2015).*

(Continued)

*Primary Examiner* — Manav Seth
(74) *Attorney, Agent, or Firm* — Duane Morris LLP

(57) ABSTRACT

A microscopic imaging method, includes illuminating a specimen with illumination radiation and capturing detection radiation along a detection axis. The detection radiation is caused by the illumination radiation, at a first time as a wide-field signal and at a second time as a composite signal. The composite signal is formed by a superposition of a confocal image and a wide-field image; extracting the confocal image by subtracting the wide-field signal from the composite signal, wherein a correction factor is used. A current correction factor is ascertained for each executed imaging and/or for each imaged specimen (1) and the confocal image is extracted using the respective current correction factor.

5 Claims, 9 Drawing Sheets

(51) Int. Cl.
  *H04N 5/232* (2006.01)
  *G02B 21/00* (2006.01)
  *G06T 5/00* (2006.01)
  *H04N 5/32* (2006.01)
  *G06T 7/00* (2017.01)

(52) U.S. Cl.
  CPC ....... *H04N 5/2256* (2013.01); *H04N 5/23232* (2013.01); *H04N 5/3205* (2013.01); *G06T 2207/10056* (2013.01); *G06T 2207/10148* (2013.01); *G06T 2207/20216* (2013.01); *G06T 2207/20224* (2013.01)

(58) Field of Classification Search
  CPC ........... G06T 2207/20216; G06T 2207/20224; G02B 21/008; H04N 5/2256; H04N 5/23232; H04N 5/3205
  See application file for complete search history.

(56) References Cited

U.S. PATENT DOCUMENTS

| | | | | |
|---|---|---|---|---|
| 6,144,489 A * | 11/2000 | Wilson | ............... | G02B 21/0024 359/368 |
| 6,341,035 B1 * | 1/2002 | Miura | ............... | G02B 21/0044 359/363 |
| 6,426,835 B1 * | 7/2002 | Endo | ............... | G02B 21/0044 359/234 |
| 6,545,265 B1 * | 4/2003 | Czarnetzki | ......... | G02B 21/0044 250/234 |
| 6,687,052 B1 * | 2/2004 | Wilson | ............... | G02B 21/0024 359/234 |
| 6,778,323 B2 * | 8/2004 | Endo | ............... | G02B 21/0044 359/234 |
| 7,369,696 B2 * | 5/2008 | Arini | ................... | G01N 15/1475 382/128 |
| 8,542,899 B2 * | 9/2013 | Athelogou | ......... | G06K 9/00134 382/128 |
| 9,449,377 B2 * | 9/2016 | Sarkar | .................... | G06T 5/003 |
| 9,569,828 B2 * | 2/2017 | Munck | ............... | G06K 9/00134 |
| 10,006,922 B2 * | 6/2018 | Dasari | .................... | G01N 33/49 |
| 10,129,448 B2 * | 11/2018 | Dillon | ................ | A61B 5/0066 |
| 10,154,785 B2 * | 12/2018 | Sachse | ............... | G01N 21/6456 |
| 2021/0239953 A1 * | 8/2021 | Langholz | ............ | G01B 11/0608 |

OTHER PUBLICATIONS

German Search Report dated Jan. 21, 2019.
Neil, M.A.A., et al.; "A fight efficient optically sectioning microscope"; Journal of Microscopy 1998; 189(2):114-117.
Wilson, T., et al.; "Confocal microscopy by aperture correlation"; Optics Letters 1996; 21(23):1879-1881.

* cited by examiner

Fig. 8       PRIOR ART

MICROSCOPIC IMAGING METHOD USING A CORRECTION FACTOR

RELATED APPLICATIONS

The present application claims priority benefit of German Application No. DE 10 2018 210 606.1 filed on Jun. 28, 2018, the contents of which is incorporated by reference in its entirety.

FIELD OF THE INVENTION

The invention relates to a microscopic imaging method according to the preamble of the independent claim.

BACKGROUND OF THE INVENTION

A problem existing in the technical field of microscopy, for example in the high-resolution three-dimensional representation of biological/technical specimens or specimen regions, is that of impinging the specimen with the lowest possible intensities of illumination radiation while, at the same time, having high intensities of detection radiation available for high-resolution detection and imaging. At the same time, the provision of the image data and the subsequent imaging should be implemented in the shortest possible time, ideally in real time.

DE 10 2014 004 249 A1 has disclosed the approach of correlative spinning disk microscopy. In a method for determining a topography of a sample by means of correlative spinning disk microscopy disclosed therein, the following steps are carried out: There is a vertical movement of an object stage and/or focus drive during an alternating capture of first and second images of a specimen placed on the object stage. In the process, a vertical focus position is stored as a metadatum for each image. Two first or two second images are interpolated in a further step and an intermediate image or intermediary image is obtained. For the purposes of producing a confocal image for a certain vertical position, the intermediary image is combined by calculation with the second or first image at said position.

The use of suitable masks in the illumination and/or detection beam path for the purposes of producing composite images and non-confocal images is known from WO 97/31282 A1. A confocal image is extracted by an appropriate, combination by calculation from these two image types. This allows very fast imaging. At the same time, a high proportion of the detection light is used, and so it is sufficient to illuminate the specimen with low-intensity illumination radiation.

The publications by Neil et al. (Neil, M. A. A et al. (1997), A light efficient optically sectioning microscope; Journal of Microscopy 189: 114-117) and Wilson et al. (Wilson, T. et al. (1996), Confocal microscopy by aperture correlation: OPTICS LETTERS 21: 1879-1881), too, propose possibilities by means of which confocal signals can be extracted from composite images and wide-field images.

When calculating the confocal image, the following formula can find use;

Confocal signal=(composite signal)−$n$*(wide-field signal).

Here, the factor n is a correction factor, which is ascertained once, and independently of the specimen, for an imaging system and which is applied without change. The correction factor is used to compensate system-related deviations, for example different transmission values of the optical paths of composite signal and wide-field signal. Using this procedure, it is possible, for example, to capture stacks of images (z-stack) along a detection axis, also referred to as z-axis below, and to combine these for the purposes of three-dimensional imaging, for example a topography of the specimen.

SUMMARY OF THE INVENTION

The invention is based on the object of proposing an improved option for three-dimensional imaging, in particular using low illumination intensities.

The object is achieved by a microscopic imaging method according to Claim 1. Advantageous developments are found in the dependent claims.

The microscopic imaging method includes the step of illuminating a specimen with illumination radiation and capturing detection radiation along a detection axis, said detection radiation having been caused by the illumination radiation. The detection radiation is captured as a wide-field signal at a first time and as a composite signal at a second time, said composite signal being formed by a superposition of a confocal image, or the signals thereof, and a wide-field signal. A confocal image is obtained by subtracting the wide-field image from the composite image, with a correction factor being used. Here, the wide-field image signals are subtracted from the composite signals, with the correction factor being taken into account.

The method is characterized in that a current correction factor is ascertained for each executed imaging and/or for each imaged specimen. The respective confocal image is extracted using the respective current correction factor.

Surprisingly, it was found that setting a correction factor for the imaging system once for the applications as originally envisioned is completely sufficient; however, the method according to the invention not only reduces imaging aberrations but also allows new classes of materials to be examined.

Therefore, the core of the invention consists of moving away from the specimen-independent correction factor and determining the latter dynamically for each measurement or each specimen.

The surface of the specimen is recognized by the employed evaluation algorithm on the basis of a captured intensity maximum of the detection radiation. The ratio of the intensities between wide-field image and composite image, or between the signals thereof, may change under certain circumstances, for example if high contrasts are present in the specimen and/or in the case of autofluorescence of the specimen to be imaged. As a consequence of a change in the intensity ratio between wide-field image and composite image, an intensity maximum can incorrectly be identified above or below the actual surface of the specimen, or the position of the surface is calculated incorrectly. Here, the incorrectly calculated intensity values are so high that these are not recognized as artifacts and therefore not eliminated by means of a noise cut filter, for example. As a result, depressions or elevations in the specimen, which are not in fact present, are calculated.

For the analysis of the above-described aberrations calculated images were arranged one above the other in the direction of the z-axis (z-stack) and this z-stack was observed from the side (a so-called orthoview). The distribution of the intensities along the z-axis was evaluated. Here, it was recognized that stray light is distributed relatively uniformly or constantly over a relatively broad z-range (see FIG. 1).

Proceeding from this discovery, options for ascertaining the current correction factor are proposed; these are explained in more detail below.

For the purposes of ascertaining the current correction factor in a correction plane chosen along the detection axis at a distance from a surface of the specimen in one configuration of the method, at least one correction wide-field image and one correction composite image are captured in each case. The image data (signals) of the correction wide-field images, which are also referred to as correction images, and correction composite images are ascertained and a current correction factor is ascertained, for example calculated or derived, on the basis of the ascertained image data.

A focus of the detection objective lens or of the detection system is directed to the expected position (expected z-position) of the surface for the purposes of capturing image data, and consequently a focus plane is defined. The distance is the spacing between the focus plane and the correction plane.

It is advantageous if the distance of the correction plane is selected to be so large that no structures of the surface pass through the correction plane. Thus, the distance can be chosen from a range of four to six full widths at half maximum of the pointspread function of the detection objective lens or of the detection system used to capture the detection radiation. By way of example, the distance can be four, four and a half, five or six full widths at half maximum.

A correction wide-field image and a correction composite image are produced and captured at a sufficient distance from the surface during each measurement. Then, the specimen-specific and current correction factor, which is used in the formula specified above, is determined from these two correction images.

Variations in the distance between the correction plane and the surface of the specimen are possible over a certain range since the stray light component is distributed in relatively constant fashion along the z-axis. Moreover, variations in the production of the composite image are possible, for example by virtue of a slotted mask being used. It is also possible to use a spinning disk with a poorly adapted pinhole size, a micro-display with a poorly adapted pinhole size or a laser scanning microscope (LSM) with a poorly adapted pinhole size.

There are various options for ascertaining the current correction factor. The latter can be ascertained from the mean brightnesses of the correction images. Here, the grayscale values of each of the correction images are averaged and the calculated mean value is used.

Instead of the simple arithmetic mean of the grayscale values, the images may also be evaluated pixel-by-pixel. A dedicated current correction factor can be assigned to each picture element or pixel.

Since the pixel-by-pixel generation of a current correction factor and the use thereof when producing images can lead to discontinuities and hence lead to artifacts, suitable calculation filters, for example median filters or Gaussian filters, are subsequently applied to the image data where necessary in order to smooth these. The current correction factor is therefore ascertained for each pixel pair of the correction images. Here, each pixel pair is formed by a certain pixel of the correction wide-field image and the pixel of the correction composite image corresponding thereto.

A further advantageous configuration of the method consists of the two correction images being recorded both above and below the focus plane with the expected position of the surface of the specimen—i.e., in a correction plane in front of and behind a current focus plane—and of both correction image pairs being included in the calculation. This configuration can be used in the case of sufficiently transparent specimens, in particular.

A recording workflow containing the recording of the at least two correction images for determining the current correction factor is advantageous for the purposes of carrying out the method according to the invention.

In a further configuration, the correction wide-field image is calculated from the z-stack and used for ascertaining the correction factor. By way of example, a mean value is formed using three-dimensional data of the z-stack.

The advantages of the invention lie in the fact that, inter alia, it is possible to dispense with the single calibration of the specimen-independent correction factor during the operational startup. Moreover, the significantly better signal quality means that filter steps, which serve to remove random or systematic positive and/or negative signal increases (outliers) in the method according to the prior art, are dispensed with during the evaluation.

A further advantage of the method, according to the invention consists in an adapted correction factor being able to be determined automatically even in the case of conventional aperture correlation, significantly increasing the user-friendliness and the quality of the image data.

The method can be used particularly advantageously with those image capturing apparatuses in which wide-field images and composite images are captured separately and successively and, in particular, stored and processed as stack recordings.

The method according to the invention can be used particularly advantageously for imaging topographies of the surface of specimens. Here, the method can be used, in particular, in the field of material testing and quality control. By way of example, metallic surfaces that have been machined with material removal can be imaged with a significantly improved quality. Reflections and/or sharp transitions on the surface do not lead to signal elevations, or only to a small extent, in the case of the method according to the invention.

The use of the method according to the invention opens up the possibility of even examining strongly reflecting specimens such as lacquered specimens, light-sensitive specimens such as biological specimens, for example, and auto-fluorescing specimens such as many types of paper, for example.

BRIEF DESCRIPTION OF THE DRAWINGS

The invention will be explained in more detail below on the basis of figures and exemplary embodiments. In the figures.

DETAILED DESCRIPTION OF THE DRAWINGS

Figure 1:
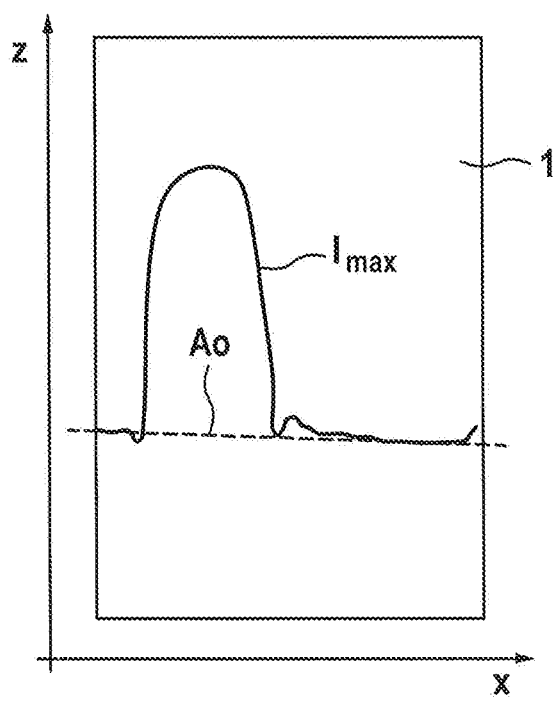
FIG. 1 is a schematic illustration of a section through a z-stack (orthoview)

FIG. 1 shows an example of a so-called orthoview of a z-stack of images of a specimen 1. In each case, the images were calculated according to the formula Confocal signal=(composite signal)−$n$*(wide-field signal).

The position of the surface Ao of the specimen 1 is indicated by an arrow and by a dotted line. Moreover, there is a plot of the intensity maxima along the x-axis. The x-axis extends orthogonal to the z-axis and approximately parallel to the surface Ao.

Over large sections of the x-axis, the surface Ao is characterized by strong reflections and intensity maxima connected therewith, approximately level with the same z-coordinate. The intensity maxima are found at higher z-coordinates in a section in the left-hand part of the curve Imax. This may mean that a depression or an elevation is situated in this region of the specimen 1, which corresponds to the relevant x-coordinates, depending on how the coordinate system in FIG. 1 was placed in advance.

Figure 2:
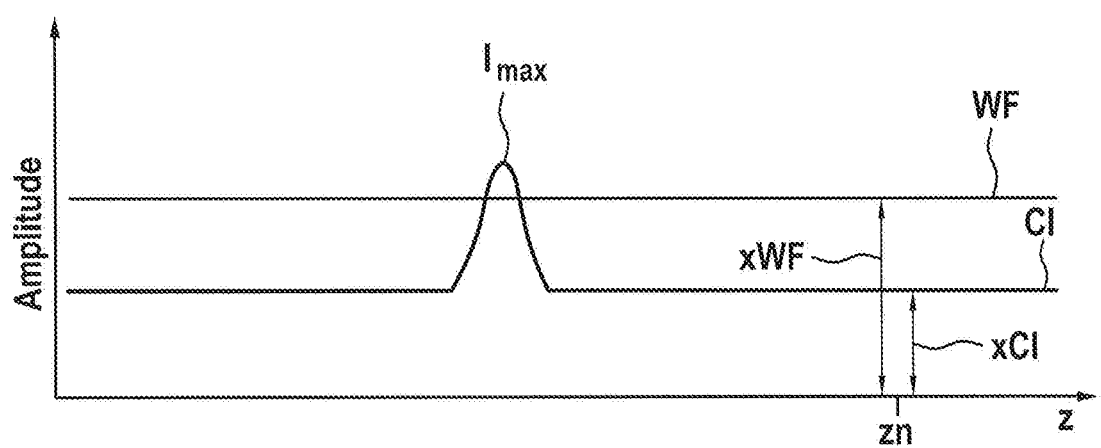
FIG. 2 is a schematic illustration of a first option for determining a current correction factor.

An option for ascertaining the current correction factor n is illustrated schematically in FIG. 2. Plotted along the z-axis are the values of the amplitude of the wide-field signal WF and of the composite signal CI (composite image) in exemplary fashion. A maximum (peak) of the amplitude values of the composite signal CI can be identified in a focus plane. By way of example, this intensity maximum Imax denotes the surface Ao of the specimen 1 (see FIG. 1, for example). The amplitude values xWF of the wide-field signal WF and the amplitude values xCI of the composite signal CI are ascertained in a correction plane with the z-coordinate zn. The current correction factor n can be ascertained from the ratio of amplitude values xWF and amplitude values xCI.

Figure 3:
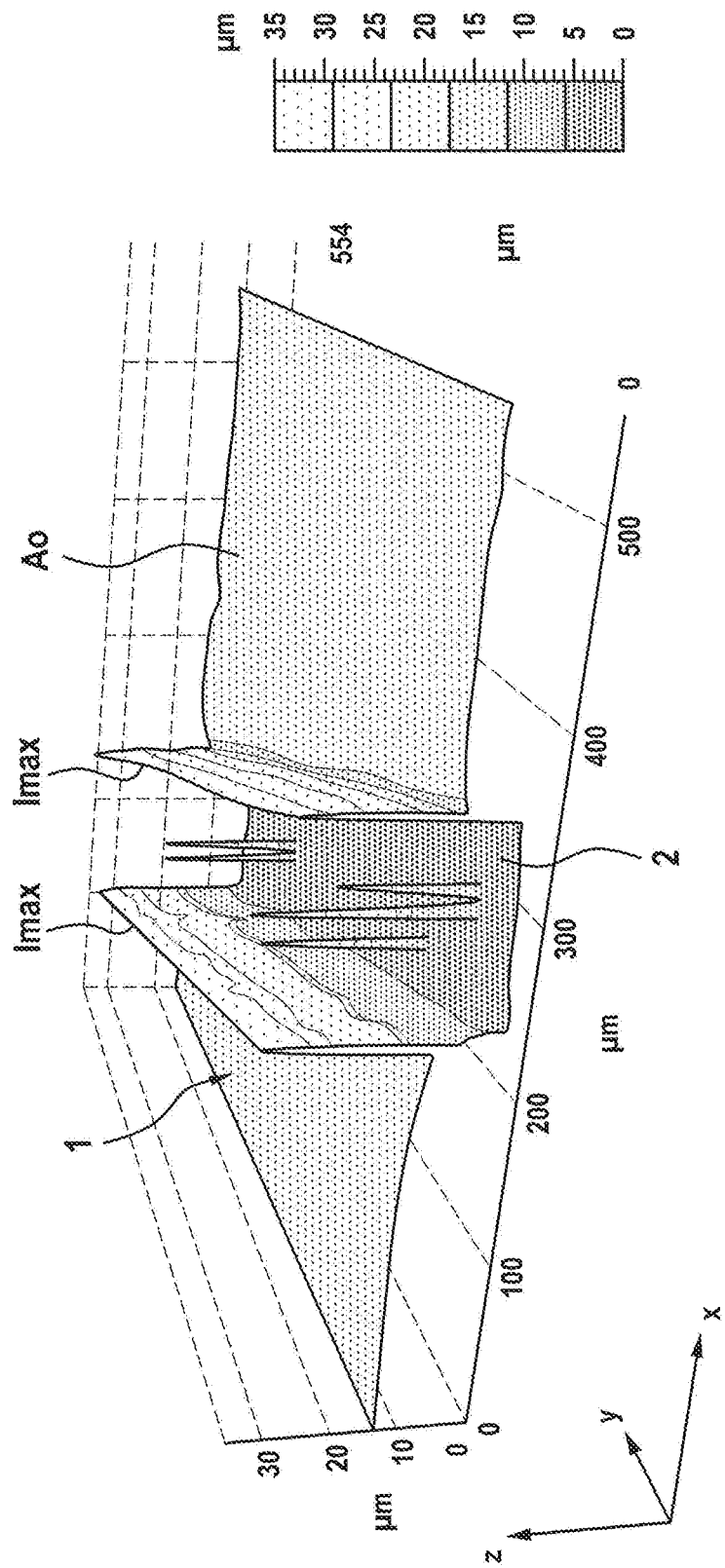
FIG. 3 is a graphical representation of a surface of a specimen with selected signal curves according to the prior art.

FIG. 3 schematically shows the measurement results of a specimen 1, a groove-shaped depression 2 running through its surface Ao. The image data calculated by a method according to the prior art show high intensity peaks Imax along the edges of the depression 2. As a result, an elevated edge of the depression 2 is depicted in an image resulting therefrom, even though such an elevation is not even present in actual fact.

Figure 4:
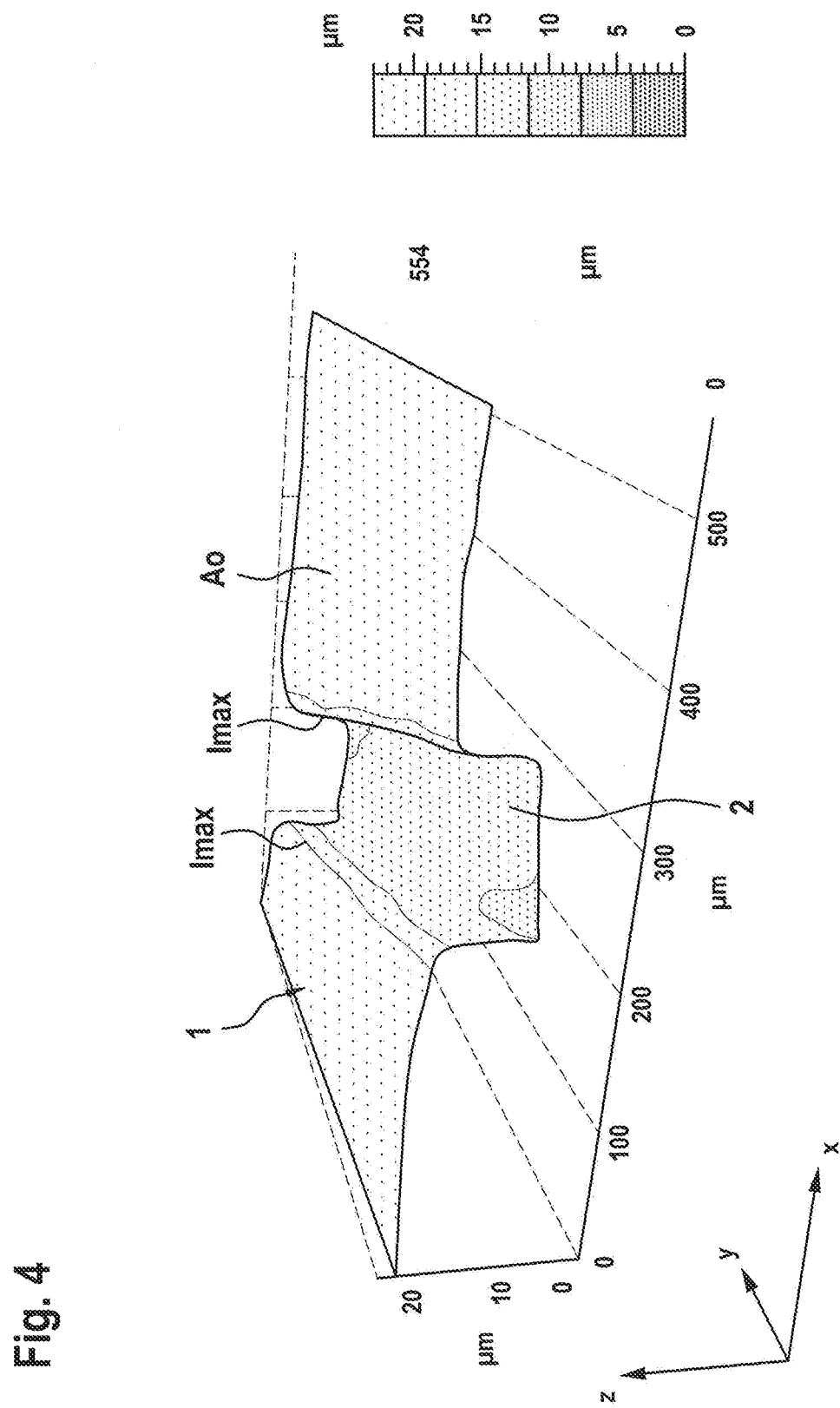
FIG. 4 is a graphical representation of the surface of the specimen with selected signal curves according to the method according to the invention.

By contrast, the intensity peaks Imax along the edges of the depression 2 are substantially lower if the image data were ascertained by means of the method according to the invention (FIG. 4). The depression 2 is depicted without an elevated edge, or with only a very small elevated edge, which corresponds to the actual topography of the specimen 1.

In the further FIGS. 5 to 10, the image data obtained by means of the method according to the invention are plotted in each case as height values along the z-axis against the x-axis. Instead of along the x-axis, the height values could also be plotted along the y-axis that extends orthogonal to the x-axis and to the z-axis (not shown).

Figure 5:
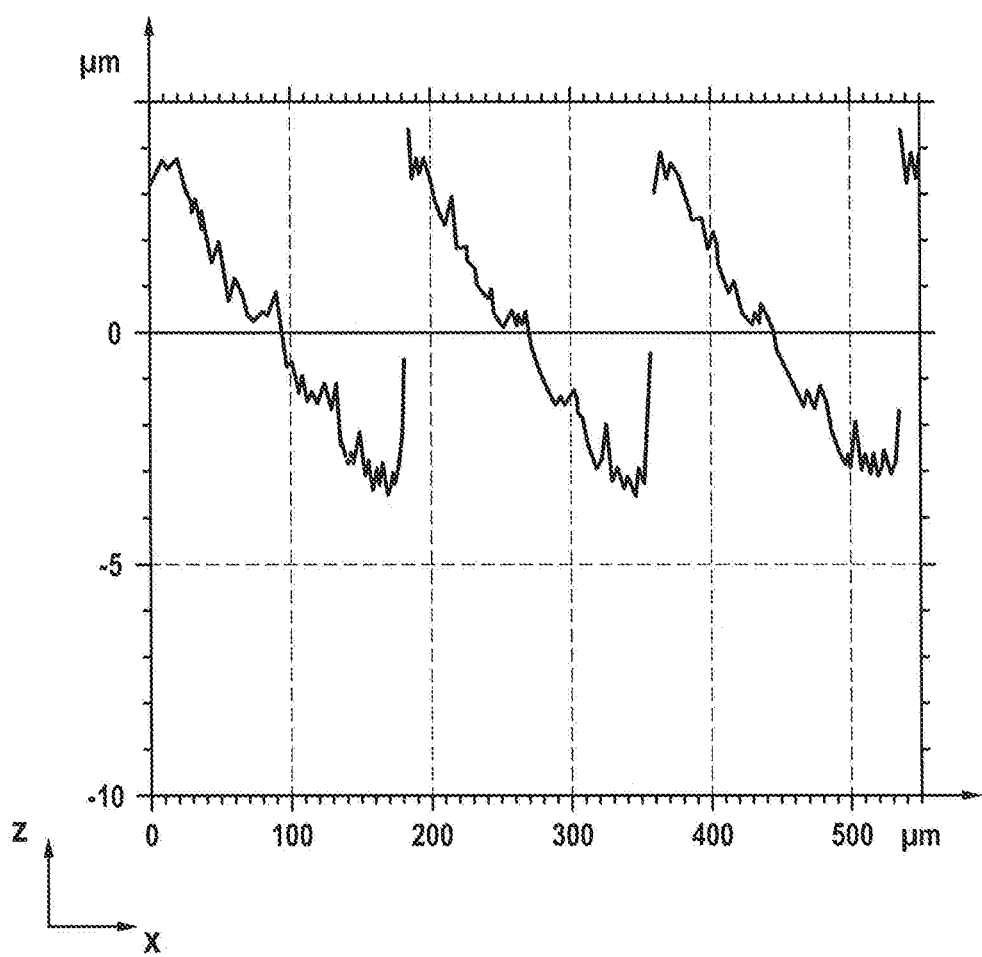
FIG. 5 is a graph of signal curves along a z-stack of a metal surface machined with material removed according to the method of the invention.

FIG. 5 shows image data of the topography of a specimen 1 made of a metallic substance. The specimen 1 was machined by milling. The individual tracks of the milling tool can be identified by the periodic sequence of amplitude values around the zero.

Figure 6:
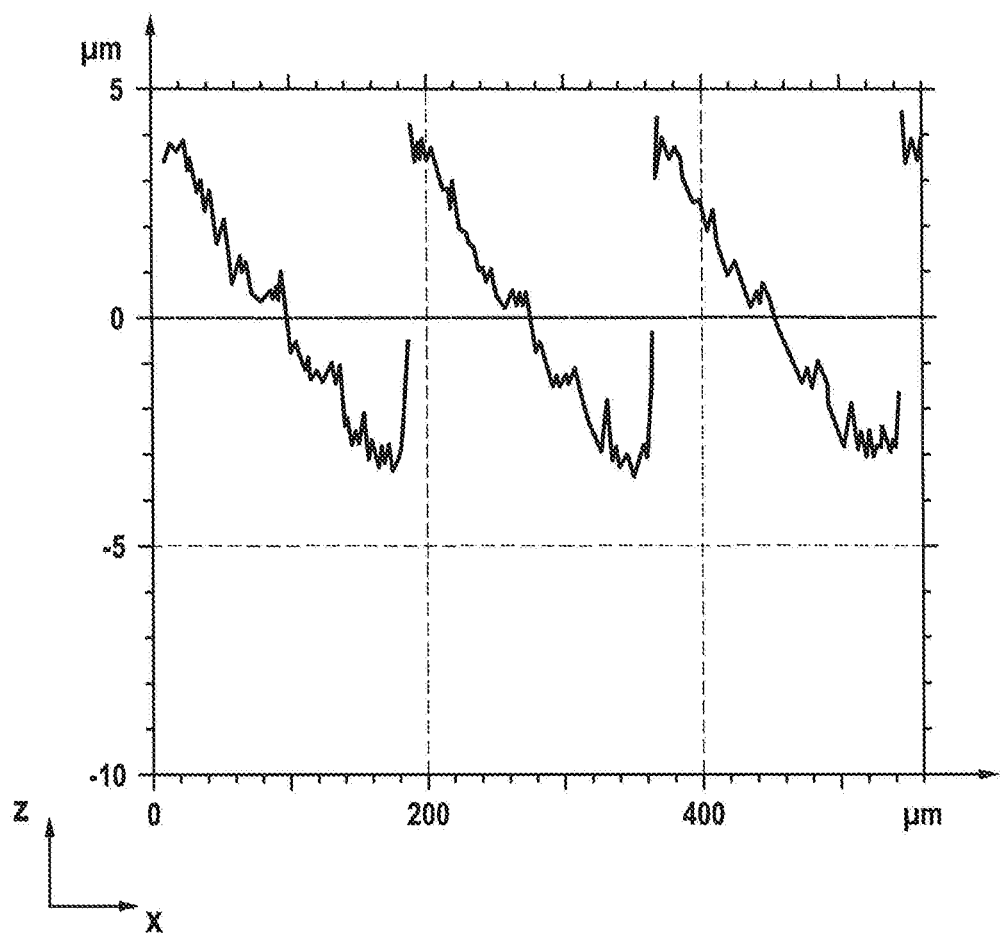
FIG. 6 is a graph of signal curves along the z-stack of the metal surface machined with material removed according to the prior art.

The image data of the same specimen 1 show intensity peaks Imax in the regions of the periodic changes in direction, which do not reproduce the actual profile of the surface Ao (FIG. 6). Already the fact that the intensity peaks Imax are extremely narrow indicates the presence of imaging aberrations instead of actual surface forms.

Figure 7:
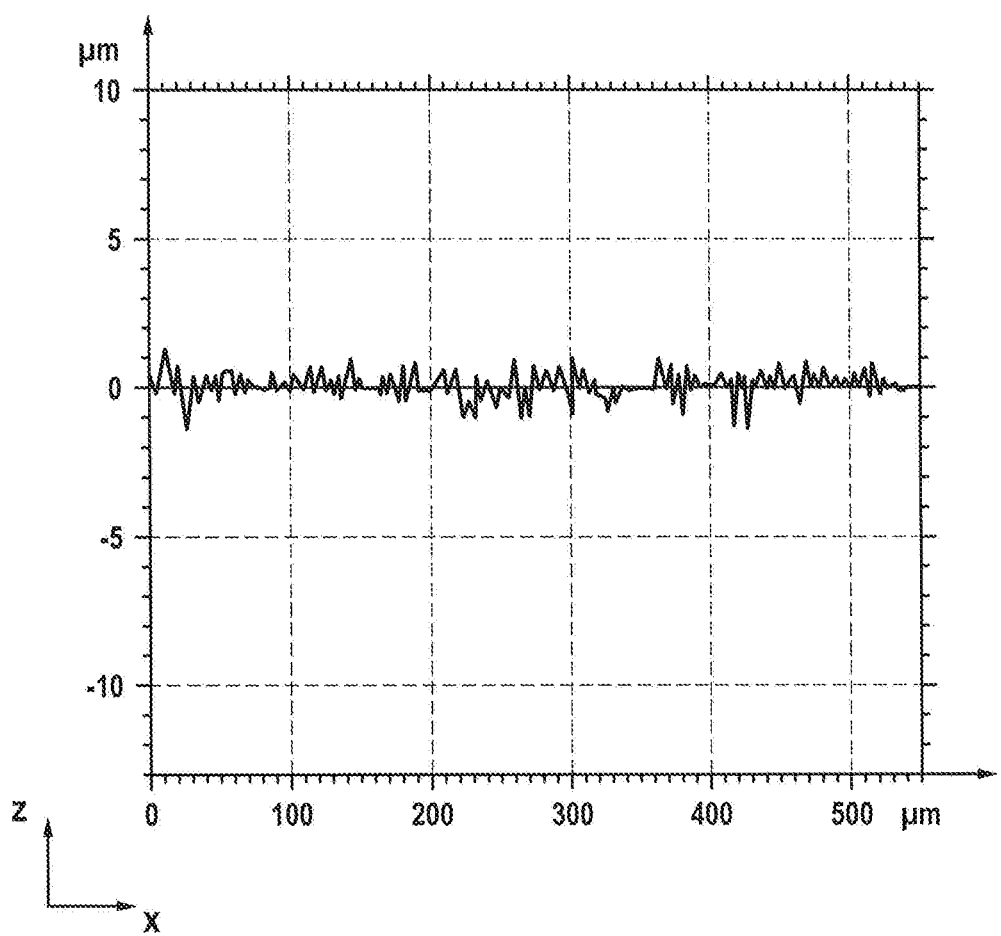
FIG. 7 is a graph of signal curves alone a z-stack of a surface of a specimen provided with metallic lacquer according to the method of the invention.
Figure 8:
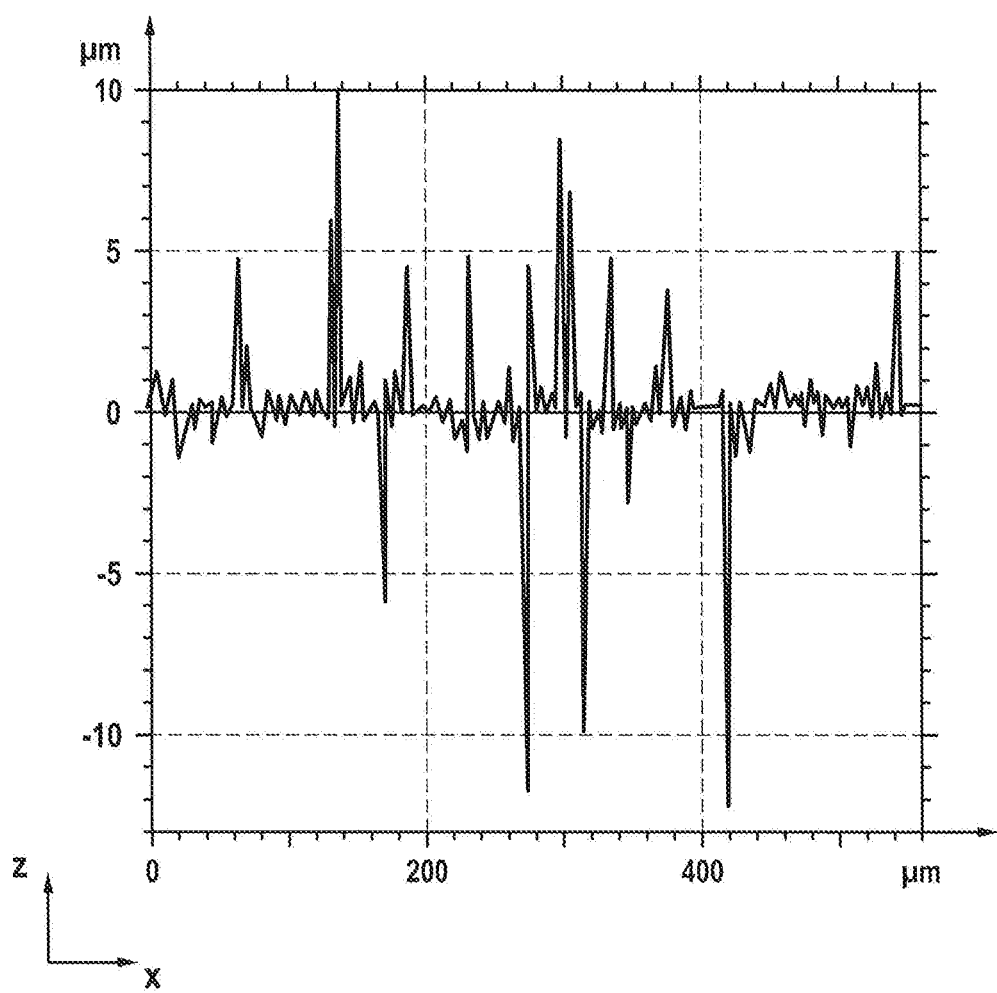
FIG. 8 is a graph of signal curves along the z-stack of the surface of the specimen provided with metallic lacquer according to the prior art.

The same can be seen in FIGS. 7 and 8. When using the method according to the invention, a surface Ao of the specimen 1 provided with metallic lacquer is identified, and depicted, with a topography with a spread of approximately 1.5 to 2 μm about the zero position (FIG. 7). By contrast, the topography of the specimen 1 created by means of a method according to the prior art has a spread of approximately 5 to more than 10 μm (FIG. 8).

Figure 9:
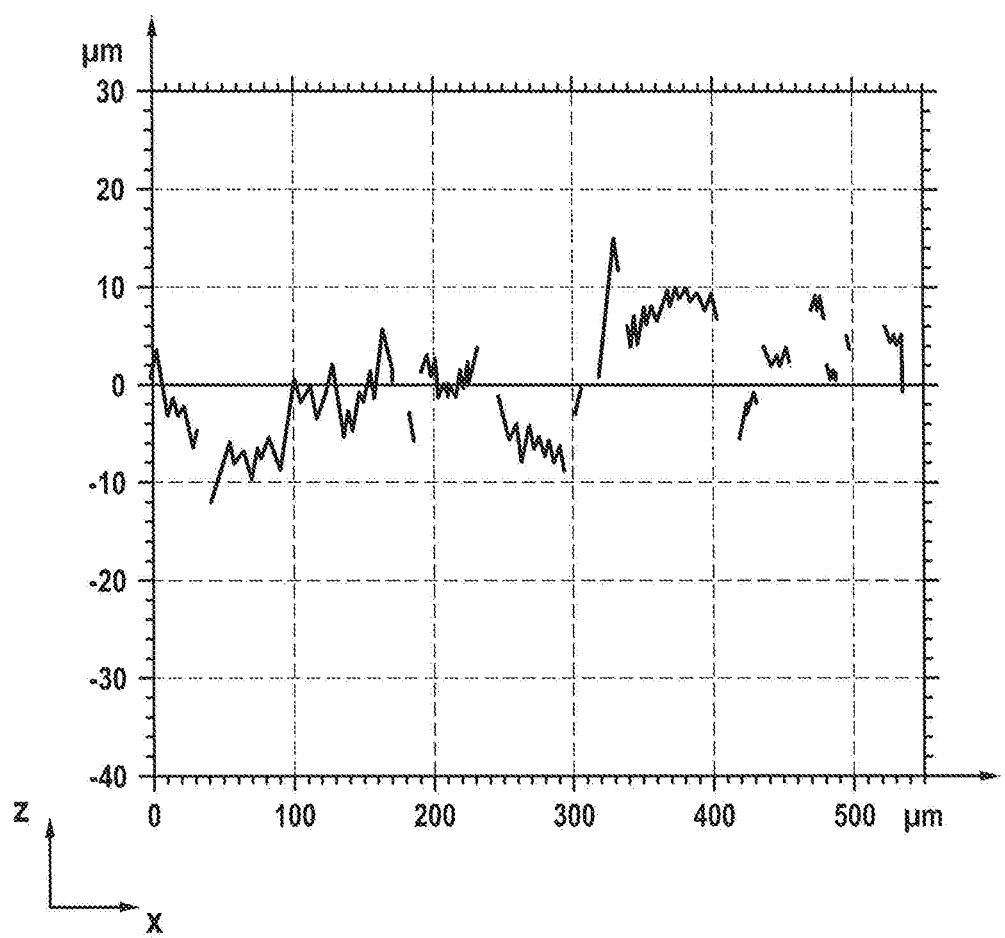
FIG. 9 is a graph of signal curves along a z-stack of a surface of a specimen made of paper according to the method of the invention.
Figure 10:
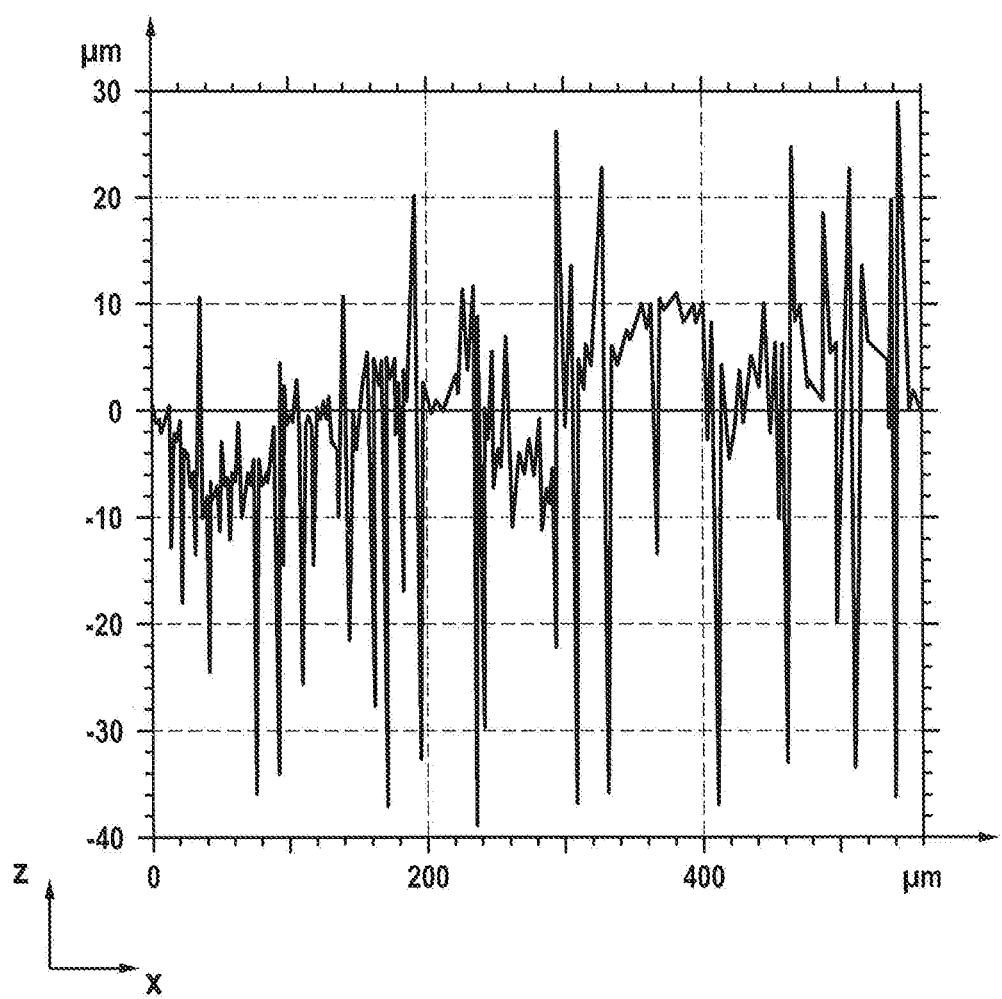
FIG. 10 is a graph of signal curves along a z-stack of the surface of the specimen made of paper according to the prior art.

Very similar results are obtained in the case of a specimen 1 made of paper. FIG. 9 shows the comparatively rough surface Ao of the specimen 1 with a spread of approximately 10 μm about the zero position.

By contrast, the incorrectly occurring intensity peaks when using a method according to the prior art lead to a spread of 30 to 40 μm about the zero position.

This exemplary embodiment shows that specimens 1 made of paper or with a fluorescent (autofluorescent) surface Ao can be examined in respect of their topography with the aid of the method according to the invention. By contrast, methods according to the prior art do not lead to a satisfactory result or require additional steps in order to reduce the intensity peaks.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Specimen
2 Depression
Ao Surface (of the specimen 1)
CI Composite signal
Imax Intensity maximum, intensity peak
WF Wide-field signal
xCI Amplitude value (of the composite signal CI)
xWF Amplitude value (of the wide-field signal WF)
zn Position (of the correction plane)

What is claimed is:
1. Microscopic imaging method, comprising:
illuminating a specimen with illumination radiation and capturing detection radiation along a detection axis, said detection radiation having been caused by the illumination radiation, at a first time as a wide-field signal and at a second time as a composite signal, forming said composite signal by a superposition of a confocal signal and a wide-field signal, extracting the confocal signal by subtracting the wide-field signal from the composite signal, wherein a correction factor is used, ascertaining a current correction factor for each executed imaging and/or for each imaged specimen and extracting the confocal signal using the respective current correction factor, wherein, for the purposes of ascertaining the current correction factor in a correction plane chosen along the detection axis at a distance from a surface of the specimen, at least one correction wide-field image and one correction composite image are captured in each case, the image data thereof are ascertained and a current correction factor is ascertained on the basis of the ascertained image data; wherein the distance of the correction plane is chosen to be so large that no structures of the surface pass through the correction plane.

2. Method according to claim 1, wherein the distance of the correction plane is chosen from a range of four to six full widths at half maximum of the pointspread function of the objective lens used to capture the detection radiation.

3. Method according to claim 1, wherein at least one correction wide-field image and one correction composite image are captured in each case in a correction plane in front of and behind a current focal plane.

4. Method according to claim 1, wherein the current correction factor is ascertained from a mean brightnesses of a correction wide-field image and a correction composite image.

5. Method according to claim 1, wherein a current correction factor is ascertained for each pixel pair of the correction images.

* * * * *

UNITED STATES PATENT AND TRADEMARK OFFICE
CERTIFICATE OF CORRECTION

PATENT NO. : 11,238,575 B2  
APPLICATION NO. : 16/445802  
DATED : February 1, 2022  
INVENTOR(S) : Drescher et al.

Page 1 of 1

It is certified that error appears in the above-identified patent and that said Letters Patent is hereby corrected as shown below:

On the Title Page

Item (72) Inventors: now reads: "Viktor Drescher, Blankenhain (DE);"  
should read: --Viktor Drescher, Weimar (DE);"--

In the Specification

Column 1, Line 39     now reads: "producing a confocal image fora certain vertical position, the"  
should read: --producing a confocal image for a certain vertical position, the--

Column 1, Line 46     now reads: "priate, combination by calculation from these two image"  
should read: --priate combination by calculation from these two image--

Column 1, Line 59     now reads: "mula can find use;"  
should read: --mula can find use:--

Column 2, Line 60     now reads: "For the analysis of the above-described aberrations cal-"  
should read: --For the analysis of the above-described aberrations, cal- --

Column 4, Line 20     now reads: "A further advantage of the method, according to the"  
should read: --A further advantage of the method according to the--

Signed and Sealed this  
Twenty-sixth Day of April, 2022

Katherine Kelly Vidal  
*Director of the United States Patent and Trademark Office*